(12) United States Patent
Lu

(10) Patent No.: US 7,012,595 B2
(45) Date of Patent: Mar. 14, 2006

(54) HANDHELD ELECTRONIC DEVICE WITH TOUCH PAD

(75) Inventor: Jin Lu, W. Croton-on-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 416 days.

(21) Appl. No.: 09/822,440

(22) Filed: Mar. 30, 2001

(65) Prior Publication Data

US 2002/0140680 A1 Oct. 3, 2002

(51) Int. Cl.
*G09G 5/00* (2006.01)

(52) U.S. Cl. .................................... 345/173; 178/18.01
(58) Field of Classification Search ........ 345/173–178, 345/168; 178/18.01–18.09, 18.11, 19.01–19.06; 340/712; 341/26, 29
See application file for complete search history.

(56) References Cited

U.S. PATENT DOCUMENTS

| | | | | |
|---|---|---|---|---|
| 5,543,588 A | | 8/1996 | Bisset et al. .................. 178/18 |
| 5,581,243 A | * | 12/1996 | Ouellette et al. ............ 345/173 |
| 5,729,219 A | | 3/1998 | Armstrong et al. ........... 341/20 |
| 6,020,878 A | * | 2/2000 | Robinson ..................... 345/173 |
| 6,052,606 A | * | 4/2000 | Bowen ........................ 455/566 |
| 6,121,960 A | * | 9/2000 | Carroll et al. ............... 345/173 |
| 6,130,665 A | * | 10/2000 | Ericsson ..................... 345/173 |
| 6,278,443 B1 | * | 8/2001 | Amro et al. ................. 345/173 |
| 6,414,671 B1 | * | 7/2002 | Gillespie et al. ............. 345/157 |
| 2002/0118175 A1 | * | 8/2002 | Liebenow et al. .......... 345/168 |

FOREIGN PATENT DOCUMENTS

| | | |
|---|---|---|
| GB | 2330981 A | 5/1999 |
| GB | 2339505 A | 1/2000 |
| GB | 2344905 A | 6/2000 |

* cited by examiner

*Primary Examiner*—Alexander Eisen
(74) *Attorney, Agent, or Firm*—Michael E. Belk

(57) ABSTRACT

An ergonomically held portable electronic device having a touch pad with a pressure sensitive simulated keyboard. The user places his or her fingers upon the touch pad in positions representing the keys of the keyboard. One quickly adjusts to the use of this improvised keyboard and is able to sense where to place one's fingers. Very quickly, an average user can be rapidly entering lengthy textual messages with ease.

27 Claims, 3 Drawing Sheets

HANDHELD ELECTRONIC DEVICE WITH TOUCH PAD

FIELD OF THE INVENTION

The present invention relates to handheld electronic devices, such as portable or mobile computers, PC tablets or notebooks, e-books, other wireless telecommunications devices and palm pilots, and more particularly to a handheld electronic device that has an ergonomically positioned touch pad disposed on a rear portion thereof, in order to easily and quickly input messages and information therein.

BACKGROUND OF THE INVENTION

Handheld electronic devices, such as palm pilots and other miniaturized, often wireless devices, usually provide a touch pen for the user, in order to touch and enter letters displayed upon its screen. As any one who has ever spelled out a message in this fashion knows, such a procedure is very slow and cumbersome. Thus, users often have difficulty putting information into the unit, to send e-mail or to write a memo.

The rationale for commercializing the palm pilot, specifically, is that it is not meant to replace a computer. Rather, the device is designed as a handy means for sending terse messages alerting the office via e-mail, for updating a calendar, or for entering a phone number, sales order, or address, on the spur of the moment. At present, a palm pilot is nothing more than an enhanced, up-scale organizational tool. To a greater or lesser extent, so too are other portable electronic devices, such as PC tablets or notebooks.

Some users of such electronic devices, however, have sought a more traditional usage, by attaching small or reduced sized keyboards to the unit, in an effort to readily enter text. This works fine for some, but is not a complete answer to the problem of text input. In the first instance, carrying a keyboard along with the miniaturized device greatly reduces the convenience of having to carry only one small device upon one's person. In a second instance, the use of a keyboard with a portable device flies in the face of its intended usage, the purpose being that of a mobile electronic device for use away from a desk or other flat surface.

These units have found a niche in the marketplace, but their present text entering limitations impede a ubiquitous usage by the public. Clearly, it would greatly enhance the capabilities and commercialization of palm pilots and other similarly situated hand held devices, if textual inputs could more easily be entered.

The present invention seeks to provide miniaturized, portable, handheld electronic devices with a means by which an average user could quickly spell out a message or otherwise enter textual information.

The current invention contemplates fitting an ergonomically held touch pad to the back of a portable electronic device for simulating a keyboard. The user places his or her fingers upon this touch pad in positions representing the keys displayed on the screen of the unit. One quickly adjusts to the use of this improvised keyboard, and is able to sense where to place one's fingers. Very quickly, an average user can be writing lengthy textual messages using this apparatus. The apparatus could be further enhanced by displaying on the front screen of the device a visualization of user finger placement, a trajectory of such placement, and the orientation of the fingers about the touch pad. Such visualization is used as a positive feedback learning tool, and can be disabled, once touch typing on this pad is etched in the user's memory. The unit can comprise a switch for eliminating the display of one's finger positions, once the user is comfortable with the touch pad and its operation.

This invention also has in its purview to employ a limited usage of voice recognition vocabulary, in order to enhance the flexibility of the electronic device. The voice recognition capability would be used to recognize simple commands that invoke rapid changes of screen status (e.g., for the transmission of messages, for the storage of typed text, and for the shifting to spelling and thesaurus tools). In other words, voice recognition would be used as a substitute for key commands.

SUMMARY OF THE INVENTION

In accordance with the present invention, there is featured a handheld device, not unlike present day palm pilots, for input of information. The handheld device comprises a display on the front face, and at least one touch pad on its rear face. The touch pad disposed upon the rear face is used to simulate a keyboard for entering letters displayed in keyboard fashion upon the front face of the unit.

In operation, the unit is held in both hands, with the thumbs resting upon the peripheral edge of the front face screen, and the remaining fingers disposed in a comfortable, ergonomic position about the rear touch pad. The front screen keyboard display can have a traditional placement of keys, or it can be designed to conform to the finger placement on the touch pad, not unlike certain commercially available ergonomic keyboards. The user of this handheld device would be able to rapidly enter text into the device. While the user is positioning his or her fingers, the user can be shown where the fingers are being placed, to determine accurate positions thereof prior to activating the specific key(s). A switch can be provided to disable the visual display when the user is confident of his or her finger positions.

In a second embodiment of the invention, a limited usage of voice recognition is implemented to enhance the flexibility of the electronic device. The voice recognition capability is used to recognize simple commands that invoke rapid changes of screen status (e.g., for the transmission of messages, for the storage of typed text, and for the shifting to spelling and thesaurus tools). In other words, voice recognition would be used as a substitute for keystroke commands.

It is an object of the present invention to provide an improved handheld device for entering text.

It is another object of this invention to provide an improved portable electronic device that comprises a simulated keyboard for the rapid input of text.

BRIEF DESCRIPTION OF THE DRAWINGS

A complete understanding of the present invention may be obtained by reference to the accompanying drawings, when considered in conjunction with the subsequent detailed description, in which.

For purposes of brevity and clarity, like components and elements of the apparatus of this invention will bear the same designations or numbering throughout the figures.

DESCRIPTION OF THE PREFERRED EMBODIMENT

Generally speaking, the invention contemplates fitting an ergonomically held touch pad to the back of a portable, miniaturized electronic device, for simulating a keyboard. The user places his or her fingers upon this touch pad in positions representing the keys displayed on the screen of the unit. One quickly adjusts to the use of this improvised keyboard, and is able to sense where to place one's fingers. Very quickly, an average user can be entering lengthy textual messages rapidly and with ease.

Figure 1:
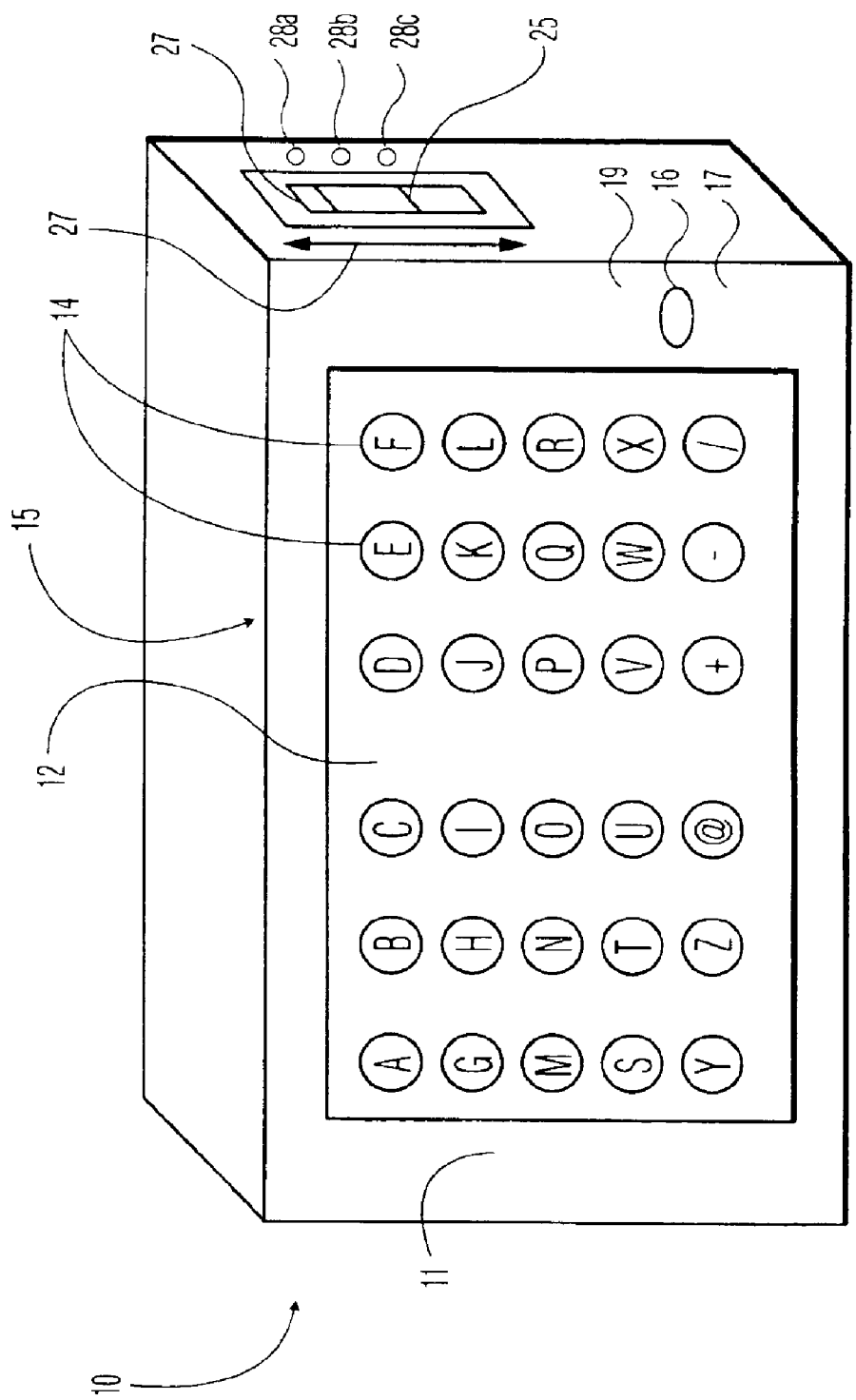
FIG. 1 illustrates a schematic, front perspective view of a handheld portable electronic device, in accordance with the present invention.

Now referring to FIG. 1, a handheld, portable electronic device 10 is shown in a front, schematic, perspective view, in accordance with the present invention. The device 10 may be any one of a number of electronic devices including, but not limited to palm pilots, PC notebooks or tablets, e-books and other wireless telecommunications devices, and comprises a display 12 on the front face 15 thereof. The display 12 comprises an LCD screen, upon which the letters and numbers 14 of an alphabet can be displayed in any order or fashion, but are generally displayed in the order befitting a standard or ergonomic keyboard format.

Figure 2:
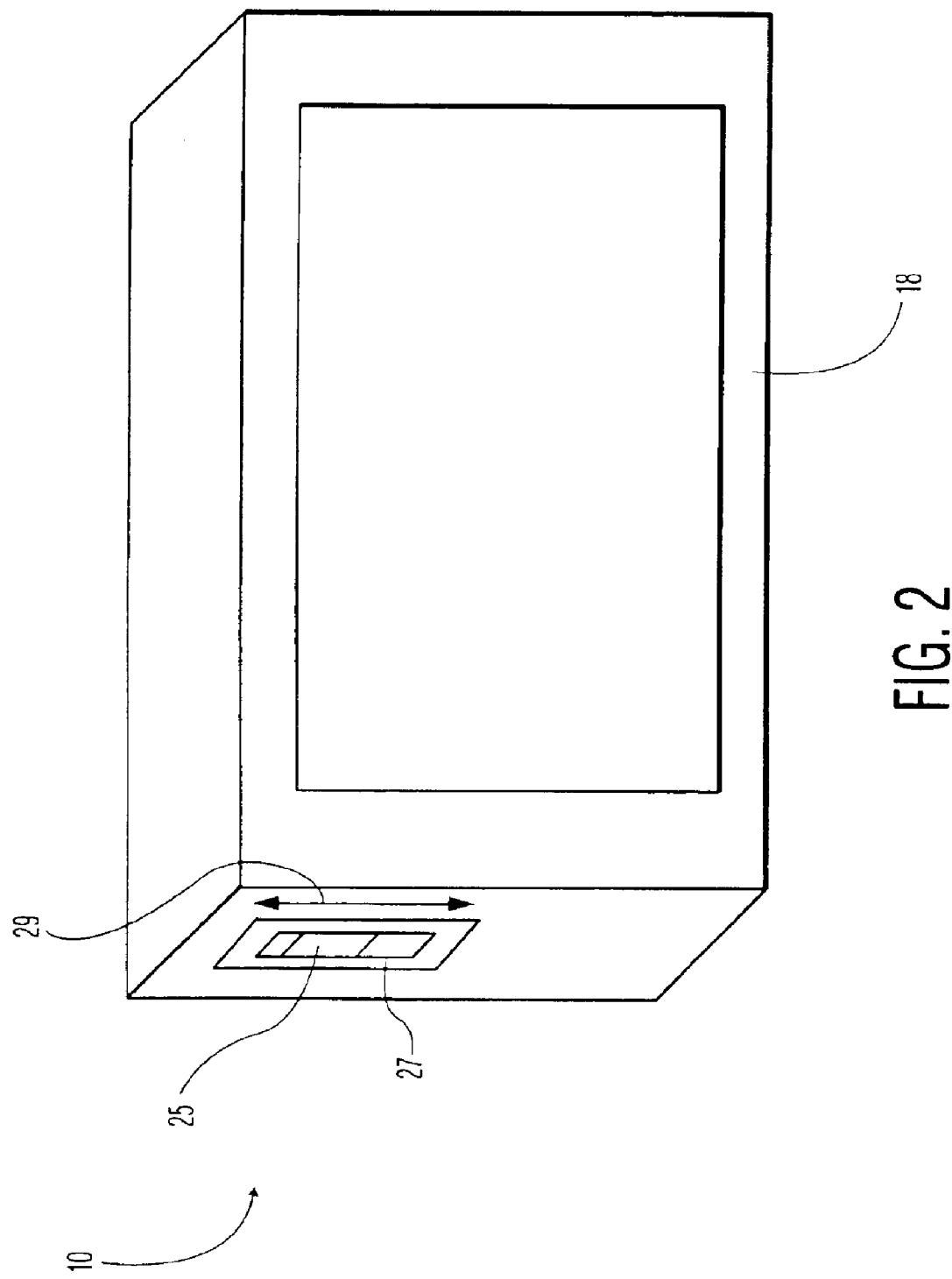
FIG. 2 depicts a schematic, rear perspective view of the handheld, portable electronic device illustrated in FIG. 1.

The device 10 is generally held in both hands, with the thumbs of the hand (not shown) disposed along the mid-portion of the respective sides 11 and 19 of the peripheral border 17. The remaining four fingers 22 (FIG. 3) of each hand are placed upon the touch pad 18 (FIG. 2) disposed on the back of device 10. The four fingers 22 of each hand are placed in an ergonomically comfortable position, as can be visualized by holding any object by both hands, in front of one's person. The placement of the four remaining fingers 22 of each hand upon the touch pad 18, as shown in FIG. 3, will be explained hereinafter, with reference to positioning the fingers 22.

Figure 3:
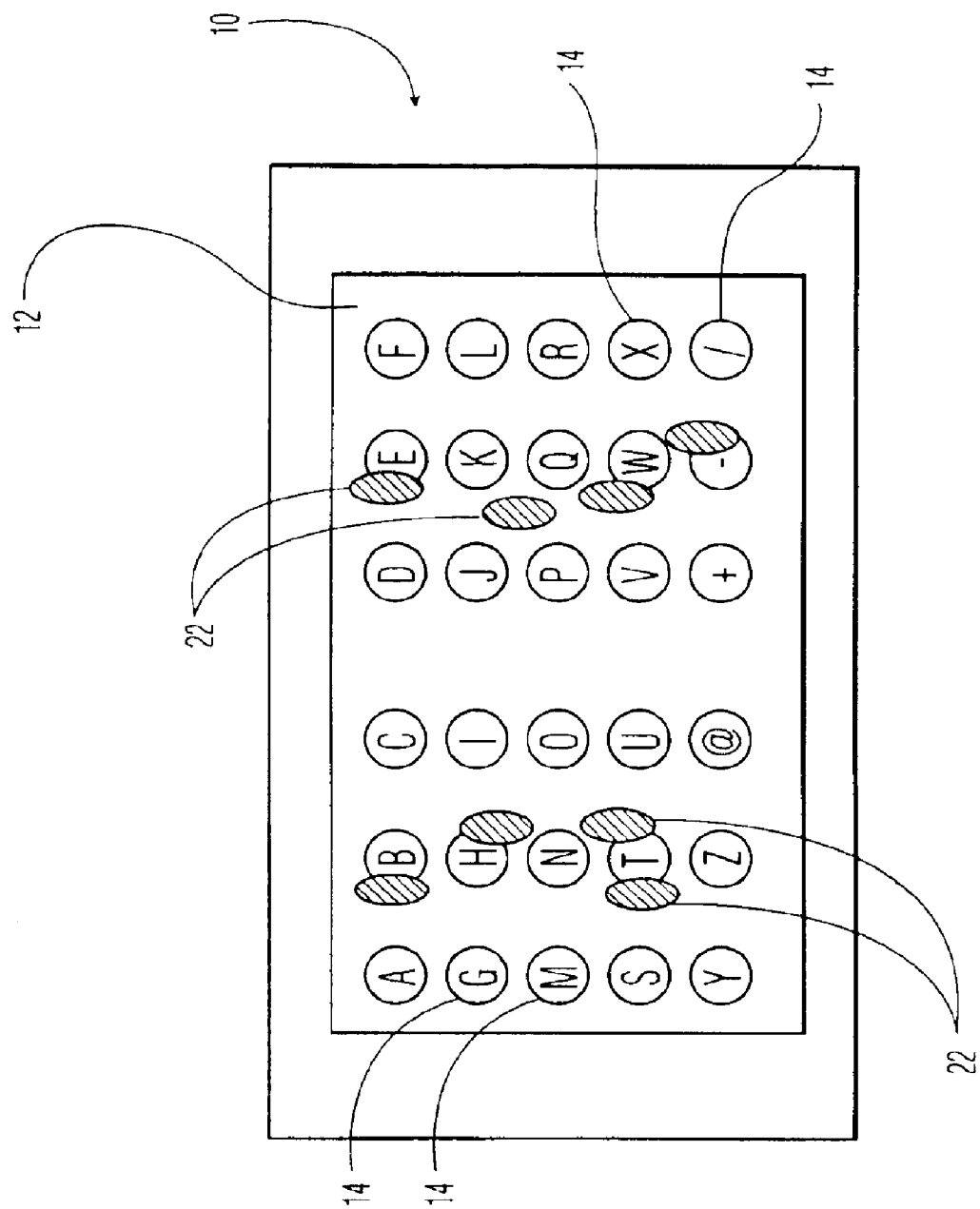
FIG. 3 shows a front view of the handheld, portable electronic device illustrated in FIG. 1, wherein finger placement upon the rear touch pad is displayed upon the front screen thereof.

The alphanumeric characters displayed on the LCD screen display 12 and the position of the fingers 22 in relationship thereto, as shown in FIG. 3, are used while positioning and activating the device 10, as will be explained hereinafter. A switch 16 is disposed upon the peripheral border 17 of screen display 12, as depicted in FIG. 1. Switch 16 can change the screen 12 to more traditional portable device display formats, if the user has mastered the ability to enter text from the touch pad 18 disposed upon the back of device 10, (FIG. 2) without positive feedback.

Touch pad 18 can be a single pad, or it may comprise a multiplicity of separate pads (not shown), which are designed to fit the digital fingers ergonomic pattern (exclusive of the thumbs) of either hand of the user. The touch pad 18 senses the depression of any one or more fingers of the user, simultaneously (when using a multi-touch pad) or sequentially, and registers corresponding letters of the alphabet upon the screen display 12 of FIG. 1, while positioning the fingers, as illustrated in FIG. 3. The finger position display need not use all of the device display 12, but may be adjusted to one-half or one-quarter of the display 12 size, so that other information can continue to be presented on the remainder of display 12. The threshold of the finger depression can be adjusted for the comfort of each individual by a slide switch 25 disposed upon the side of the device 10. The slide switch 25 can be moved along the slide well 27, as shown by arrows 29, in order to adjust the finger pressure necessary to register the position of a finger adjacent a textual character input for fingers 22.

This first, threshold pressure allows the user to determine the position of the fingers but is not sufficient to activate the keys. Only when the fingers bear down with greater pressure, exceeding a second threshold pressure, are the desired characters selected and displayed on the main portion of the display 12. The input of text is displayed in normal fashion, as one is used to viewing a train of text upon a computer screen. The slide switch 25 disposed in slide well 27 is used to move back and forth among pressure threshold positions 28a, 28b, and 28c, respectively, as shown by arrows 29. In this way, different users can adjust the device 10 for their individual positioning ("light") touch and also their individual activation ("heavier") touch.

As aforementioned, the device 10 is generally held in both hands, with the thumbs of the hand (not shown) disposed along the mid-portion of the respective sides 11 and 19 of the peripheral border 17 (FIG. 1). The remaining four fingers 22 on each hand are placed upon the touch pad 18 in an ergonomically comfortable position, as can be visualized by holding any object by both hands, in front of one's person. The placement of the fingers 22 upon the touch pad 18 can be seen in the positioning mode, shown upon the display 12 of FIG. 3.

As aforementioned, the keyboard configuration can be traditional, ergonomic, or other, as befits the preference of the user. The device can be software implemented with a variety of keyboard configurations, which the user can select to assist in his or her adaptation to the device 10. Zones on the keypad can be assigned to keys. For example, a grid of zones forming six columns and five rows, not shown, results in thirty zones, each of which can represent a unique character. Also displayed on the screen 12 while positioning the fingers 22 (FIG. 3) are the placement of the fingers 22, which show the relationship between the fingers 22 and the characters 14 of the chosen keyboard configuration, as well as the trajectory of the fingers 22 leading up to their present positions.

When the second pressure threshold is exceeded, the display 12 presents text in sentences and paragraphs using a word processing format. In other words, at or beyond the first pressure threshold of the touch pad 18, the finger positions are displayed on display 12; at or beyond the second pressure threshold of the touch pad 18, the characters are actually activated and input to the system. The device 10 can be programmed to provide a particular word processing capability as befits the user, understanding that such capability is operative with keystrokes only, since one would not have the benefit of a mouse.

Such keystrokes can be invoked from a tool bar or can be invoked by voice recognition. Voice recognition can be limited only to certain keystroke commands, such as: "send the e-mail message", "store the text", "spell check", etc. In the future, when voice recognition technology improves, it is contemplated that voice recognition can take over or supplement the traditional textual input method described herein.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A handheld device for rapidly and easily inputting text, comprising:
 a display for showing the input of text; and a touch pad disposed anywhere on said handheld device except over said display, said touch pad being pressure sensitive, wherein finger pressure on said touch pad will input textual information upon said display, and further comprising means for adjusting a first pressure threshold of said touch pad, below which said display is dormant and above which finger positions on said touch pad are displayed, wherein said means for adjusting the first pressure threshold further comprises means for selecting the first pressure threshold from a predetermined set of discrete pressure thresholds.

2. The handheld device in accordance with claim 1, wherein said device further comprises means for indicating finger positions on said touch pad.

3. The handheld device in accordance with claim 1, wherein said touch pad comprises a keyboard for placement of fingers.

4. The handheld device in accordance with claim 1, wherein said touch pad comprises a standard keyboard configuration.

5. The handheld device in accordance with claim 1, wherein said touch pad comprises a multiplicity of finger sensitive pressure zones.

6. The handheld device in accordance with claim 1, wherein said touch pad is positioned behind said display.

7. The handheld device in accordance with claim 1, wherein said display comprises an LCD screen.

8. The handheld device in accordance with claim 1, wherein said display comprises means for displaying text in a word processing format.

9. The handheld device in accordance with claim 1, wherein said touch pad comprises means for adjusting finger pressure necessary for activating said keyboard and inputting text.

10. The handheld device in accordance with claim 1, wherein said means for adjusting the first pressure threshold of said touch pad comprises a slider bar.

11. The handheld device in accordance with claim 1, wherein said means for adjusting the first pressure threshold of said touch pad comprises means for selecting the first pressure threshold from a predetermined set of three discrete pressure thresholds.

12. The handheld device in accordance with claim 1, wherein below a second pressure threshold of said touch pad said textual information will not be displayed upon said display, wherein above the second pressure threshold of said touch pad said textual information will be displayed upon said display, and wherein said second pressure threshold exceeds said first pressure threshold.

13. A handheld device for rapidly and easily inputting text, comprising:
 a display for showing the input of text; and a touch pad disposed adjacent said display that simulates a keyboard, said touch pad being pressure sensitive, wherein finger pressure on said touch pad will input textual information upon said display, and further comprising means for adjusting a first pressure threshold of said touch pad, below which said display is dormant and above which finger positions on said touch pad are displayed, wherein said means for adjusting the first pressure threshold comprises means for selecting the first pressure threshold from a predetermined set of discrete measure thresholds.

14. The handheld device in accordance with claim 13, wherein said means for adjusting the first pressure threshold of said touch pad comprises a slider bar.

15. The handheld device in accordance with claim 13, wherein said means for adjusting the first pressure threshold of said touch pad comprises means for selecting the first pressure threshold from a predetermined set of three discrete pressure thresholds.

16. The handheld device in accordance with claim 13, wherein below a second pressure threshold of said touch pad said textual information will not be displayed upon said display, wherein above the second pressure threshold of said touch pad said textual information will be displayed upon said display, and wherein said second pressure threshold exceeds said first pressure threshold.

17. A handheld portable electronic device for inputting text in a relatively rapid manner, comprising: a display for showing the input of text, comprising: a display for showing the input of text; and a touch pad disposed anywhere on said handheld device except over said display, said touch pad being pressure sensitive, wherein finger pressure inputs finger positions and textual information upon said display, and further comprising means for adjusting a first pressure threshold of said touch pad, below which said display is dormant and above which finger positions on said touch pad are displayed, wherein said means for adjusting the first pressure threshold comprises means for selecting the first pressure threshold from a predetermined set of discrete pressure thresholds.

18. The handheld portable electronic device in accordance with claim 17, wherein said touch pad comprises a keyboard for placement of fingers.

19. The handheld portable electronic device in accordance with claim 17 wherein said touch pad comprises a standard keyboard configuration.

20. The handheld portable electronic device in accordance with claim 17, wherein said touch pad comprises a multiplicity of finger sensitive pressure pads.

21. The handheld portable electronic device in accordance with claim 17, wherein said touch pad is positioned behind said display.

22. The handheld portable electronic device in accordance with claim 17, wherein said display comprises an LCD screen.

23. The handheld portable electronic device in accordance with claim 17, wherein said display comprises means for displaying text in a word processing format.

24. The handheld portable electronic device in accordance with claim 17, wherein said touch pad comprises means for adjusting finger pressure necessary for activating said touch pad and inputting text.

25. The handheld device in accordance with claim 17, wherein said means for adjusting the first pressure threshold of said touch pad comprises a slider bar.

26. The handheld device in accordance with claim 17, wherein said means for adjusting the first pressure threshold of said touch pad comprises means for selecting the first pressure threshold from a predetermined set of three discrete pressure thresholds.

27. The handheld device in accordance with claim 17, wherein below a second pressure threshold of said touch pad said textual information will not be displayed upon said display, wherein above the second pressure threshold of said touch pad said textual information will be displayed upon said display, and wherein said second pressure threshold exceeds said first pressure threshold.

* * * * *